Dec. 18, 1945. G. J. KOCH 2,391,248
STEREOSCOPIC ACUITY TESTING DEVICE
Filed Nov. 7, 1942
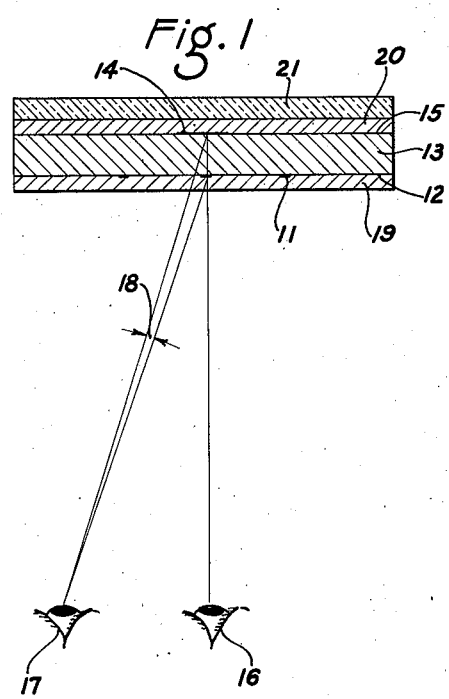
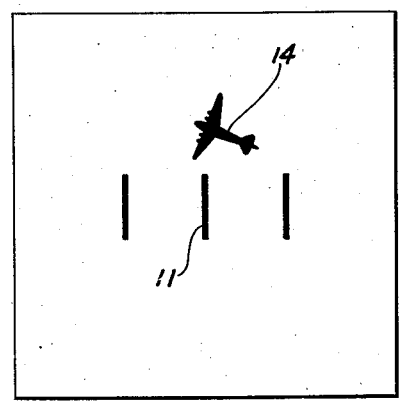
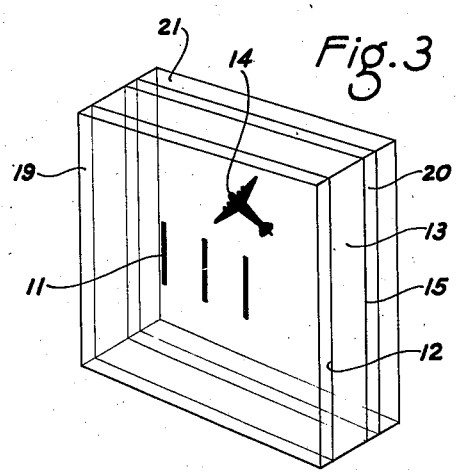
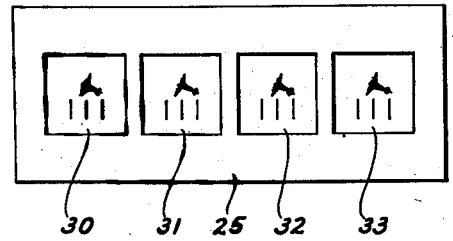
George J. Koch
INVENTOR
BY Newton M. Perrins,
J. Griffin Little
ATTORNEYS Patented Dec. 18, 1945

2,391,248

UNITED STATES PATENT OFFICE 2,391,248

STEREOSCOPIC ACUITY TESTING DEVICE

George J. Koch, Rochester, N. Y., assignor to Eastman Kodak Company, Rochester, N. Y., a corporation of New Jersey Application November 7, 1942, Serial No. 464,852

4 Claims. (Cl. 88—20)

The present invention relates to visual testing devices, and more particularly to stereoscopic acuity testing devices.

The present invention has, therefore, as its principal object, the provision of a device for testing the stereoscopic acuity of an individual.

A further object of the invention is the provision of a stereoscopic acuity testing device in which a pair of indicia are spaced a distance the magnitude of which corresponds to a stereoscopic angle of the same order as the limit of stereoscopic vision.

Another object of the invention is the provision of a stereoscopic acuity tester which is simple in construction, inexpensive to make, and which will readily and accurately determine the stereoscopic acuity of the person being tested.

To these and other ends, the invention resides in certain improvements and combinations of parts, all as will be hereinafter more fully described, the novel features being pointed out in the claims at the end of the specification.

In the drawing:

Fig. 1 is horizontal sectional view through a stereoscopic acuity testing device constructed in accordance with the present invention;

Fig. 2 is a front view of the portion of the device which carries the indicia or marks which are to be viewed by the observer;

Fig. 3 is a perspective view of a complete device illustrated in Fig. 1, showing the arrangement of the various parts; and Fig. 4 is a plan view of a group of the devices of the general type illustrated in Figs. 1 to 3, and mounted in a single holder to provide one grouping or arrangement of the various devices.

The present invention relates to a device for testing the stereoscopic acuity of a person to be examined. To secure this result, two or more distinguishable indicia, marks, or pictures, are arranged in spaced relation so that when viewed by the person, both indicia will be seen by each eye, the two eye images will be angularly spaced, as shown in Fig. 1, so that the physical spacing or depth position of the indicia may be ascertained. In order that such marks may be readily stereoscopically distinguishable, one mark may be in the form of a line and the other mark a planar figure, or they may be in the form of two lines arranged one above the other.

The test is carried on by showing the person to be tested a series of devices of the type shown in Figs. 1 and 3 in which the indicia may be spaced the same or different distances, and asking the person to judge the spacing or depth position of the indicia or to distinguish which devices have the indicia equally spaced. Obviously, any number and arrangement of these devices may be used in a test and the structure shown in Figs. 1 to 3 is merely representative of one of such devices. Fig. 4 shows one group of such devices mounted in a suitable holder, to be later more fully described. The main feature is that when the device is viewed from one side, as shown in Fig. 1, the indicia have a depth relation and can be spaced at various distances, the magnitude of which can be reduced to the limit of stereoscopic vision. By means of such a series of devices, the stereoscopic acuity of the person being tested can be quickly, easily, and accurately and definitely ascertained. The extent of such tests may be varied to suit the requirements to be met or the person being tested.

The indicia are preferably opaque and may be printed or etched on opposite faces of a transparent base or spacer sheet, such as cellulose acetate, or may be reproduced photographically on opposite side of a transparent film base. In the present embodiment, one of the indicia may be in the form of a reticle mark 11 formed on the face 12 of the transparent spacer sheet 13. The other indicia may be, for example, a planar figure in the form of an aeroplane image 14 arranged on the opposite face 15 of the spacer sheet 13, as shown in Fig. 1. The spacing of the indicia 11 and 14 is thus determined by the thickness of the spacer sheet 13.

It will now be apparent from an inspection of Fig. 1, that both indicia 11 and 14 will be visible to the right eye 16 and also to the left eye 17 of the person being tested. However, the two indicia 11 and 14 will subtend an angle 18 at the left eye 17, as clearly shown in Fig. 1. By means of this angle, the spacing or depth position of the two indicia may be thereby ascertained. The angle 18, known as the stereoscopic angle, is controlled by varying the thickness of the spacer sheet 13 to provide a varying depth or position of the two marks 11 and 14. Since the angle 18 is also influenced by the viewing distance, the interocular spacing of the eyes 16 and 17, and the refractive index of the spacer sheet 13, these factors are to be considered in making the device.

It has been found that with a viewing distance of 10 inches, a normal interocular spacing of 2½ inches, a refractive index of 1.5 of spacer sheet 13, the stereoscopic angle 18 is approximately 0.3 "unit of error" for 0.001 inch of separation of the marks 11 and 14. The term "unit of error" as used in stereoscopy refers to twelve seconds of arc, an angle which is approximately the limit of normal stereoscopic vision. It is to be understood, of course, that the viewing distance may be varied to suit the testing requirements. The stereoscopic angle 18 varies inversely as the square of the viewing distance. For example, with a viewing distance of 20 inches the stereoscopic angle 18 will be approximately 0.075 "unit of error" for .001 inch of separation of the marks 11 and 14. The thickness of the spacer sheet varies between 0.001 inch and 0.02 inch. Such an arrangement of marks and spacer sheets has proven successful in a large number of tests.

In order to eliminate surface reflection cues, and to prevent scratching or fingerprinting of the indicia marks 11 and 14, two additional transparent non-polarizing sheets 19 and 20 may be laminated to the surfaces 12 and 15 of the spacer sheet 13. If desired, the indicia 11 and 14 may be formed on the inner faces of the sheets 19 and 20 rather than on the spacer sheet 13. In either event, the indicia are actually spaced the thickness of the sheet 13, as will be apparent from an inspection of Fig. 1. A transparent lacquer coating may be substituted for the protective sheets 19 and 20, if so desired. The laminated transparent sheets with the opaque indicia 11 and 14 are preferably backed by a translucent light diffusing screen 21.

A series of these completed testing devices, as shown in Figs. 1 to 3, may be mounted in a large perforated support or holder 25, such as cardboard, so that a number of these devices may be readily available. Fig. 4 shows one of these arrangements. A number of these devices and the spacing of the indicia may be varied to any desired extent. For example, one cardboard holder 25 may have mounted thereon a plurality of such devices in which the spacer sheets 13 are of equal thickness, but with some of the devices arranged with the marks 11 on the front face and the aeroplane 14 on the back face, while others may have the aeroplane on the front face and the mark 11 on the rear face, and still others may have both marks on the same face. This will provide equal spacing but different arrangements of the two marks, and the person being tested is merely to determine in which device the mark 11 is in front of the aeroplane, and in which device the mark 11 is behind the aeroplane, or in which device the two marks are in the same plane. A second cardboard or a series of cardboards may be provided in which the various devices may have the marks 11 and 14 arranged as above, but in which the thicknesses of the various spacer sheets 13 may vary to give different spacings of the marks. The observer is then to determine not only which marks 11 and 14 are in front, but also on which devices the two marks are differently or equally spaced.

The test is usually started with a cardboard in which a series of devices with relatively thick spacer sheets 13 of equal thickness are provided. In this initial test only the position of the two marks is varied. On succeeding cardboard holders, however, the thickness of the sheets 13 may be gradually decreased to thus decrease the stereoscopic angle 18 between the marks. This decreasing sheet thickness may be combined with different arrangements of the two marks relative to the observer, and the latter is to determine not only which mark is closer to him, but which devices have the marks arranged at different or equal spacing. Thus by interchanging the positions of the marks 11 and 14 relative to the observer, and by also utilizing spacer sheets of different or equal thickness, a wide variety of tests may be provided. Obviously, the number and arrangement of such devices may be extended to suit the requirements to be met by the person being tested. Fig. 4 shows a cardboard holder 25 in which four different test devices are arranged. For example, a left-hand device 30, Fig. 4, may have the two marks in the same plane, while the next one to the right 31 may have the mark 11 ahead of the mark 14, while the third from the left 32 may have the mark 14 ahead of the mark 11. In all three of these arrangements, however, the spacer sheet 13 is of the same thickness. These three devices thus illustrate the various arrangements of the marks 11 and 14. The right-hand device 33 of Fig. 4 on the other hand, has a spacer sheet 13 which is of a different thickness than the other devices shown in Fig. 4, thus giving a different depth position of the two marks. Various other sheets of different thicknesses may have the marks arranged as shown in the other three devices illustrated in Fig. 4 to give various arrangements of spacer sheet thickness and depth position of the marks. By such an arrangement, the variation of sheet thickness and the positioning of the marks 11 and 14 may be carried out to any desired extent.

It is thus apparent from the above description that the present invention provides a simple, effective, and inexpensive device by which the stereoscopic acuity of the person being tested may be quickly, accurately and definitely ascertained. Furthermore, such devices permit a wide variety of such tests to be made to suit the requirements to be met or the individual being tested.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

I claim:

1. A device for testing stereoscopic acuity comprising, a pair of distinguishable indicia, transparent sheet means for carrying said indicia and through which at least one of said indicia is viewable, said means being of a thickness to space said indicia in depth a distance whose magnitude corresponds to a stereoscopic angle of the same order as the limit of stereoscopic vision of an observer, and a reflection reducing layer carried by said means for covering the indicia nearer the observer to prevent depth relation clues due to reflection at said nearer indicia.

2. A device for testing stereoscopic acuity comprising, a sheet of transparent material, a pair of distinguishable indicia carried by the opposite sides of said sheet and simultaneously viewable by both eyes of an observer, said sheet being of a thickness to space said indicia in depth a distance whose magnitude corresponds to a stereoscopic angle of the same order as the limit of stereoscopic vision of the observer, and a reflection reducing layer on said sheet for covering the indicia nearer the observer to prevent depth relation clues due to reflection at said nearer indicia.

3. A device for testing stereoscopic acuity comprising, a sheet of transparent material, a pair of distinguishable indicia carried by the opposite sides of said sheet and simultaneously viewable by both eyes of an observer, said sheet being of a thickness to space said indicia in depth a distance whose magnitude corresponds to a stereoscopic angle of the same order as the limit of stereoscopic vision of the observer, a reflection reducing layer on said sheet for covering the indicia nearer the observer to prevent depth relation clues due to reflection at said nearer indicia, and a translucent backing for said sheet for covering the other indicia.

4. A device for testing stereoscopic acuity comprising, a pair of distinguishable indicia, a separate light transmitting supporting means for each of said indicia, at least one of said indicia being viewable through said means, said means being of such thickness as to space said indicia in depth a distance whose magnitude corresponds to a stereoscopic angle of the same order as the limit of stereoscopic vision of an observer, and a reflection reducing layer for covering the indicia nearer said observer to prevent depth relation clues due to reflection at said nearer indicia.

GEORGE J. KOCH.